Jan. 2, 1951     G. G. LANDIS ET AL     2,536,294
ARC WELDING APPARATUS
Filed May 22, 1947     3 Sheets-Sheet 1
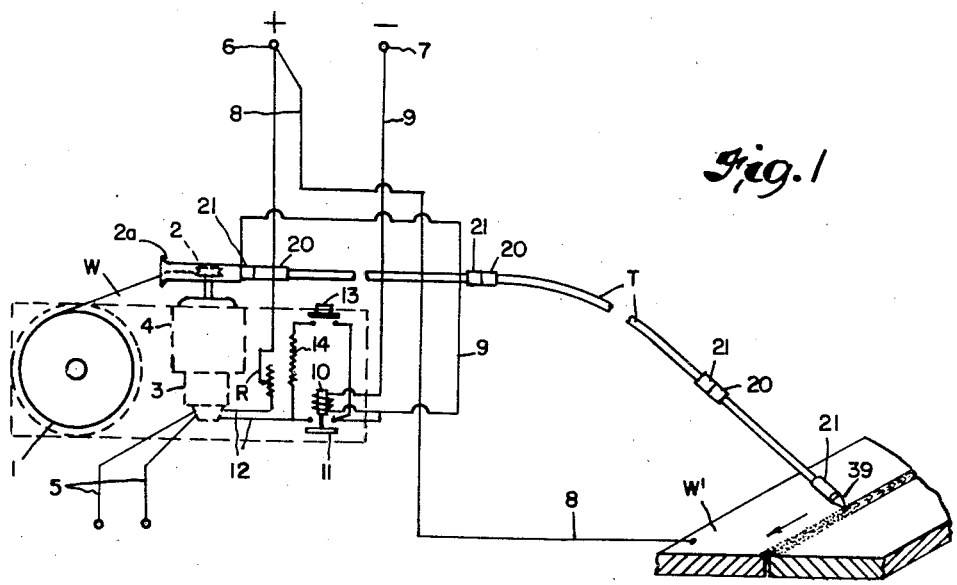
Fig. 1
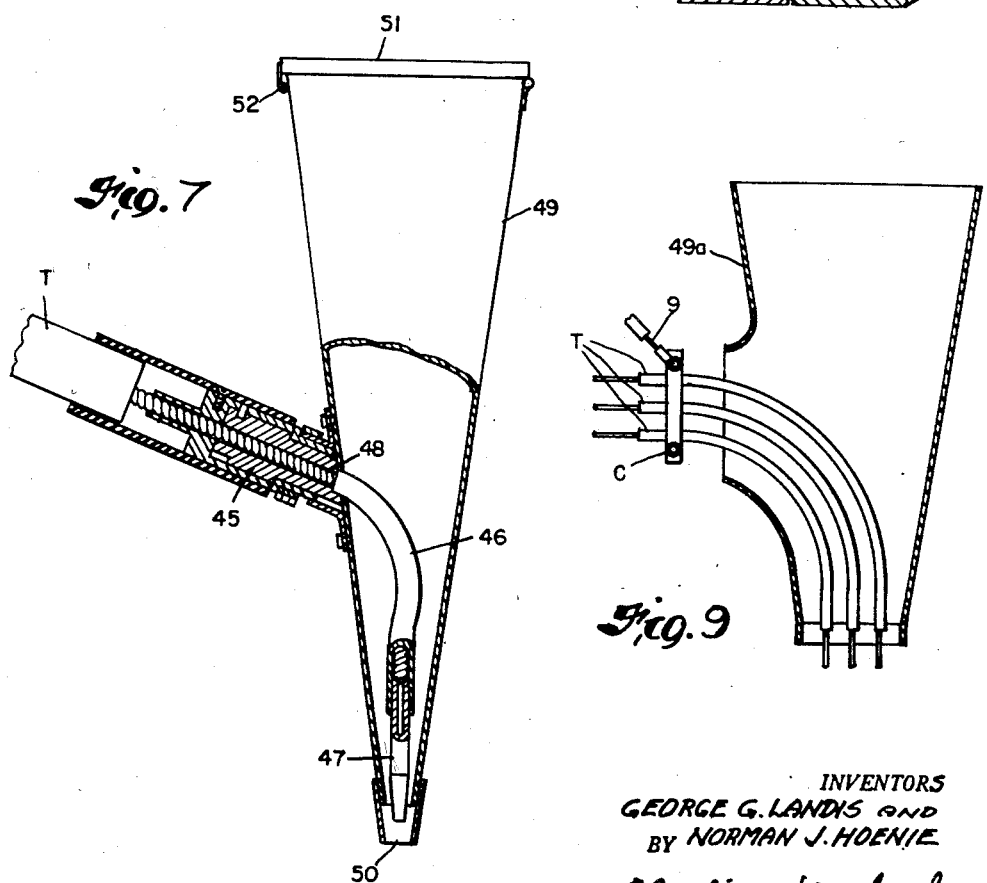
Fig. 7
Fig. 9
INVENTORS
GEORGE G. LANDIS AND
BY NORMAN J. HOENIE
Oberlin + Limbach
ATTORNEYS.

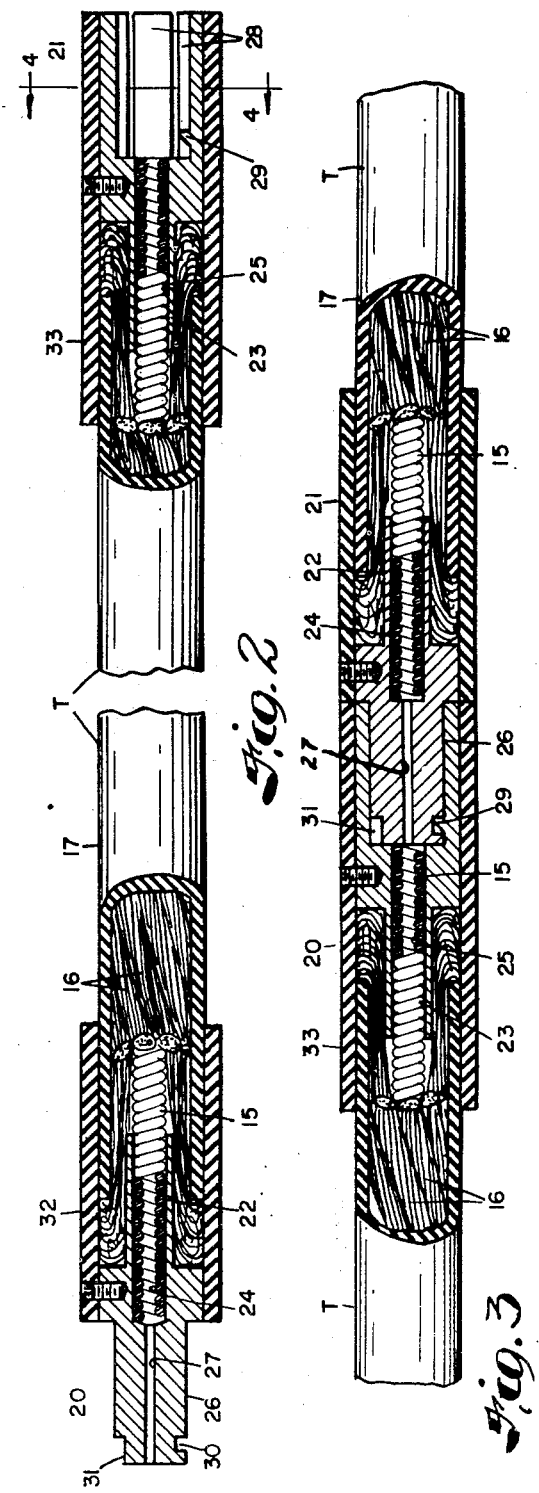

Jan. 2, 1951  G. G. LANDIS ET AL  2,536,294
ARC WELDING APPARATUS
Filed May 22, 1947  3 Sheets-Sheet 3
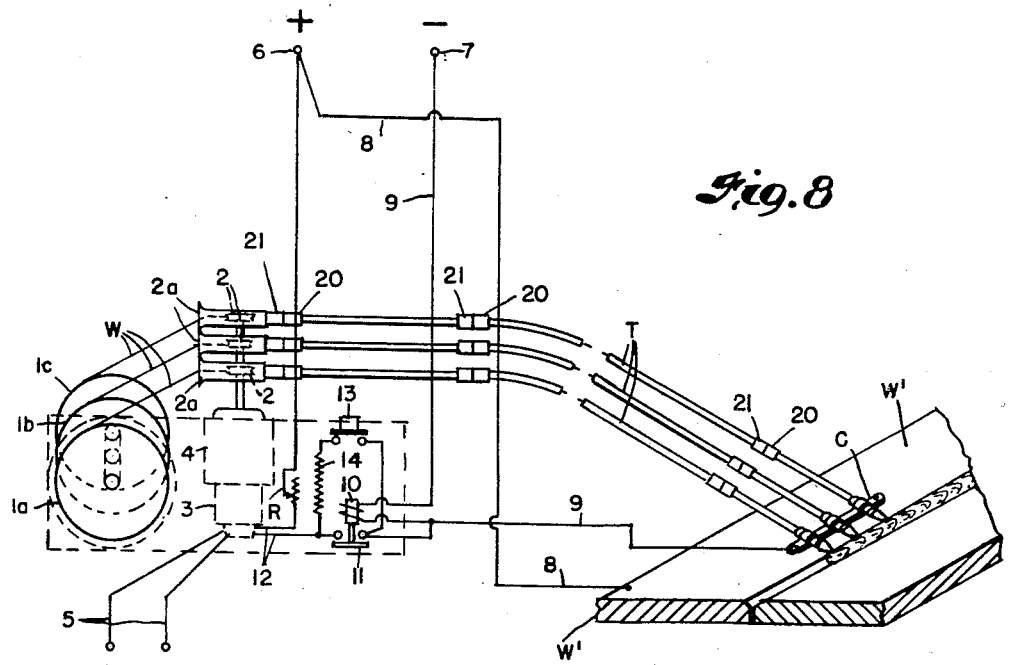
Fig. 8
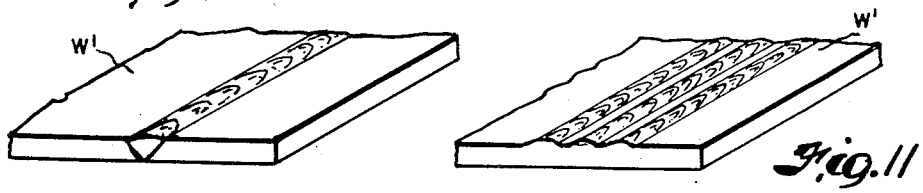
Fig. 10
Fig. 11
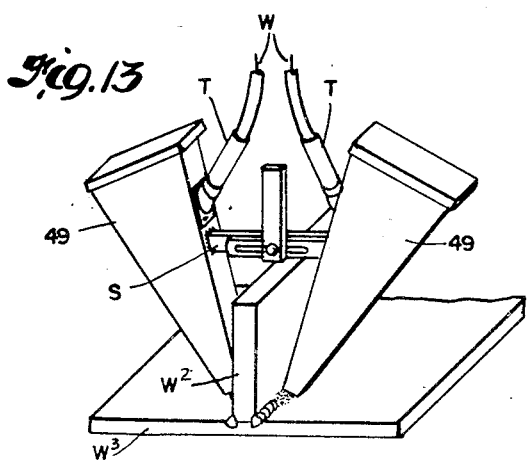
Fig. 13
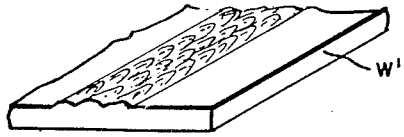
Fig. 12
INVENTORS
GEORGE G. LANDIS and
BY NORMAN J. HOENIE
Oberlin & Limbach
ATTORNEYS.

Patented Jan. 2, 1951

2,536,294

UNITED STATES PATENT OFFICE 2,536,294

ARC WELDING APPARATUS

George G. Landis, South Euclid, and Norman J. Hoenie, Cleveland Heights, Ohio, assignors to The Lincoln Electric Company, Cleveland, Ohio, a corporation of Ohio Application May 22, 1947, Serial No. 749,780

2 Claims. (Cl. 314—74)

The present improvements, relating as indicated to arc welding, have more particular regard to methods of arc welding and apparatus for use in connection therewith, in which a metallic electrode or weld rod of indefinite length is employed, such rod or wire being supplied to the point where the arc is struck and the end thereof being melted off incidentally to the welding operation.

Certain improvements, more particularly relating to the method of thus arc welding by means of a continuously fed, small diameter weld rod or wire of indefinite length are disclosed in our pending application filed June 2, 1944, Serial No. 538,366, (now Patent No. 2,444,834, dated July 6, 1948), of which the present application is a continuation-in-part. We have further discovered that by means of such improved method it is possible to feed two or more such electrode wires to the work simultaneously, while connected in parallel in the welding circuit.

The details of the flexible guide tube, hereinafter described, are claimed in my co-pending application, No. 123,046, filed October 22, 1949.

One principal object of the present invention is to provide a more satisfactory apparatus for use in carrying out such method, including provision for thus feeding plural wires to the work. In the method in question the weld rod or wire is preferably carried from suitable feeding mechanism through a flexible tubular guide to the point where the arc is to be struck, and one of the problems encountered has been the provision of such a tubular guide which will adequately stand up under the rather severe service conditions encountered, including the handling of wire moving at a relatively high rate of speed. Another problem has been the conducting of the requisite current to the end of the wire when the arc is struck and maintained during the welding operation.

The present invention accordingly, in addition to novel feeding mechanism adapted to feed plural wire electrodes, comprehends an improved construction of such flexible tubular guide, which is made of sections capable of being coupled together to provide a guide of varying length depending upon the location and character of the work. Said guide further includes as a part of its structure a conductor capable of carrying the welding current. There is also provided an improved form of welding tool which is in effect merely a terminal portion of such conductor through which the weld rod or wire is directly guided to the work, such tool being adapted for convenient manual operation.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:

Fig. 1 is a more or less diagrammatic representation of one form of apparatus embodying our present improvements;

Fig. 2 is partially a central sectional view and partially a side elevation of one of the component sections of the flexible tubular guide which forms a feature of the invention;

Fig. 3 is similarly partially a central sectional view and partially a side elevation of the ends of two such sections showing the manner in which they are adapted to be coupled together;

Fig. 4 is a transverse section through one such coupling member, the plane of the section being indicated by the line 4—4 Fig. 2;

Fig. 5 is a perspective view of the complementary coupling member;

Fig. 6 is a central sectional view of the terminal member which forms the welding tool when attached to the coupling member illustrated in Fig. 5;

Fig. 7 is a central sectional view of a modified form of terminal member which includes an attachment whereby granular fluxing material may be supplied to the work-piece at the point of welding;

Fig. 8 is a diagrammatic representation on the order of Fig. 1 but illustrating a modified apparatus whereby a plurality of welding rods or wires may be simultaneously utilized in a welding operation;

Fig. 9 is a view similar to Fig. 7 showing a form of flux feeding attachment designed for use with such modified apparatus;

Fig. 10 is a broken perspective view showing one form of weld which may be produced by such modified apparatus;

Figs. 11 and 12 are similar perspective views respectively illustrating two other forms of weld which may be thus produced; and Fig. 13 is a perspective view showing still another modification in construction whereby an apparatus employing plural weld rods or wires may be utilized in a fillet welding operation.

Referring to the illustrative apparatus shown in Fig. 1, the weld rod or wire W is shown as being drawn from a reel 1 by means of gripping rolls 2 in conventional manner, only one of which appears in said figure. However, as more fully set forth in our pending application Serial No. 538,366, in our improved method or process the weld rod or wire employed is of relatively small diameter, e. g. 1/16 inch to 5/64 inch, and comparatively high rates of feed are required, e. g. approximately 300 inches per minute for such 1/16 inch D. wire and only slightly less for the 5/64 inch D. wire. Gripping rolls 2 are driven by motor 3 through a reduction and change speed gear box 4 whereby the rate of feed of the weld rod or wire W may be set, as indicated, for each of the several sizes or diameters of wire with which the apparatus is designed to be employed. Furthermore, the current employed is of such value in relation to the cross-sectional area of the weld rod or wire as to cause substantially instantaneous fusion of the end thereof whenever such end comes in contact with the workpiece.

Current is supplied to the field of motor 3 through leads 5, from a source of current independent of the welding current, e. g. from an ordinary 120 v. power line. The welding current may likewise be taken from any suitable source, e. g. from the terminals 6 and 7 of a welding machine (not shown), which will be provided with the usual means for varying the voltage and amperage of the current, as may be found desirable for any particular operation. However, it is not contemplated nor necessary that any changes in the setting of such machine, or in other words of the welding current, will require to be made during the welding operation, or in fact for any given set-up, i. e. any operation in which it has been determined at what rate the weld rod or wire is to be fed to the work and the current appropriate for the particular operation has been selected.

One of the aforesaid terminals, preferably the positive terminal 6, is connected by means of a lead 8 with the work-piece W', while the other, negative, terminal 7 is connected by means of a lead 9 with the conductor which forms a part of a flexible tubular guide T, as will be presently described.

Operation of the motor 3 is tied in with the welding operation by the series relay 10 which is operated by welding current through the electrode lead 9 to close a switch 11 in one of the armature leads 12. In addition to this relay there is included in such armature lead a push button switch 13 which is adapted to connect the latter through a resistor 14. This last-mentioned switch is used to operate the motor to feed the wire manually when not welding, for example in initially threading the wire through the tubular guide T. An adjustable resistor R will also be desirably included in the other such armature lead 12, to permit the armature current to be set as desired.

As previously indicated, the flexible tubular guide T is preferably, although not necessarily, composed of sections, one of such sections being illustrated in Fig. 2. As there shown, the main guide element or liner 15, through which the weld rod or wire W directly passes when being fed to the work, consists of a flexible coil of hardened steel wire or equivalent wear-resisting material, the coils of which closely contact so as to maintain the tube walls closed despite any bending to which the tube may be subjected. Immediately surrounding, and in close electrical as well as physical contact with such inner tube 15, is a conductor sheath 16 formed of multi-stranded fine copper wire assembled and twisted about said inner tube, much as are the component strands in a wire cable. Conductor 16 is in turn surrounded with a heavy sheath 17 of rubber or equivalent flexible insulating material.

We have found that in a guide tube constructed as described, where the resistance of the liner 15 will greatly exceed that of the conductor sheath 16 (the latter may have a conductance several hundred times greater than the former) it becomes unnecessary to insulate the one from the other; in other words such sheath can directly contact such liner, without any consequential diversion of current thereto onto the wire, which in turn contacts with such liner. As a result the welding current is substantially entirely carried by the sheath to the terminal fitting (described later), where it enters the wire just before it emerges from the tubular guide.

From the foregoing it will be seen that not only has the construction of such guide been greatly simplified, but by eliminating the extra insulation, the handling of the guide is facilitated by reason of its increased lightness and flexibility.

It will be understood that the guide may consist of a single length of tube constructed otherwise as just described. Where of sectional construction the length of individual sections will be determined primarily by convenience in handling and storage, since by coupling together a suitable number thereof a guide of any required overall length may be provided. For the purpose of thus coupling the sections together, each thereof is provided at its one end with a male coupling member 20 and at the other with a complementary female coupling member 21. Each of said coupling members will be formed of highly conductive metal such as copper or brass, so as to constitute in effect a continuation of the conductor 16 that surrounds the flexible inner tube 15 of the guide. To insure effective electrical contact with the latter, the body of coupling member 20 is formed with a reduced tubular extension 22 and the body of coupling member 21 with a similar extension 23 that is adapted to receive in close surrounding relation the corresponding end portion of conductor 16, which will thus be bound, and preferably also brazed, thereto. At the same time the bores 24 and 25 of said tubular extensions are adapted to receive in tight fitting relation the corresponding ends of the inner flexible tube 15, which are similarly brazed thereto.

Coupling member 20 is provided with an oppositely directed heavier tubular extension 26, the bore 27 of which is of substantially equal diameter to that of said tubular member 15; while tubular member 21 is provided with a corresponding sleeve-like extension 28 which is longitudinally split and adapted to fit over and frictionally engage extension 26 of member 20. Said sleeve-like extension is further provided with an inwardly directed lug 29 that is adapted to interlock with an annular recess 30 adjacent the end of extension 26 on member 20, the outer wall of such recess being cut away at one point 31 to permit such engagement upon properly aligning the two coupling members and then turning one relatively to the other.

Each coupling member also respectively includes cylindrical shells 32 and 33 of insulating material which are firmly secured to the body portions of said members and overlie the corresponding ends of the flexible insulating layer 17 that surrounds conductor member 16. In the case of said insulating shell 33, it also projects in the opposite direction so as entirely to enclose the split sleeve extension 29 thereof. Accordingly, as illustrated in Fig. 3, when the complementary coupling members of two sections T of the flexible tubular guide are brought into proper end relation and interlocked by rotating the one relatively to the other, the respective insulating sleeves 32 and 33 will be brought into close, abutting relation and together with the flexible insulating layer 17 provide continuous insulation for the assembled sectional guide.

While the end of such guide to which the weld rod or wire W is fed by means of gripping rolls 2 may be permanently attached to the feed mechanism previously described, the exit end of the guide tube 2a associated with such rolls will preferably take the form of a female coupling 21, as described above, so that the flexible tubular guide may be entirely detached when desired. In any event, the outer end of the flexible tubular guide, irrespective of whether it comprises one or a plurality of sections, will be equipped with such female coupling member, in order to receive the terminal fitting illustrated in Fig. 6, which constitutes all that is required in the case of the present apparatus in the way of a welding tool. This fitting comprises simply a tubular core 35, one end 36 of which is of conical form, said core being provided with external threads 37 at an intermediate point to receive a threaded shell 38 of insulating material. The latter has a conical extension 39 that is adapted when threaded in place on core 35 to closely fit the conical extension 36 of said core but project therebeyond and its extremity being provided with an opening 40 aligned with the bore 41 of the core. The opposite end of the latter is provided with an annular recess 42 which has a portion of its outer wall cut away at point 43 and otherwise corresponds with the body 26 of male coupling member 20.

Accordingly the fitting just described may, as stated, be received into a female member 21 at the end of any section of the conductor and upon rotative movement will be firmly secured thereto.

From the foregoing description it will be seen that, irrespective of the number of flexible tubular guide sections employed, the inner tubes 15 thereof will be aligned throughout with the portions 27 in the male coupling members 20 and with the bore 41 in the terminal fitting last described. Also the conductor member 16 will be continuously connected throughout the length of the guide through such coupling members and finally with the core of the terminal fitting. It has been found that no special provision for effecting electrical contact between such core and the weld rod or wire being fed through the guide is necessary, since such wire as drawn from the reel and fed through the guide will necessarily undulate sufficiently to press against said core 35 at a sufficient number of points to insure the free flow of current to its extremity where the latter projects beyond the terminal fitting.

At the same time the construction and manner of coupling together the sections of the flexible tubular guide insure the exterior insulation thereof, no current-carrying element being exposed at any point throughout the length of the guide. Indeed the insulating shell 38 on the terminal fitting insures that the only live wire is the projecting end of the weld rod or welding wire itself.

The operation of our improved arc welding apparatus in its entirety may now be briefly set forth. After selecting the particular weld rod or wire with which it is desired to operate, the current is set so as to secure proper penetration of the work-piece by the arc. Thus in the case of 1/16 inch wire, with a current of from 150 to 350 amperes, penetration of from 1/16 to 1/8 inch may be secured, and with 5/64 inch wire, with a current of from 200 to 500 amperes, penetration of from 1/16 to 1/4 inch may be secured. The wire feed mechanism is then set to feed the wire at the proper rate through the flexible tubular guide, and no subsequent adjustment of such feed rolls while operating under the conditions thus established will be required. Immediately upon striking the arc by contacting the end of the wire projecting beyond the welding tool with the work-piece the wire feed is set in motion at such predetermined rate and the end of the wire which is thus kept advancing beyond the tool is melted down to form the usual bead. As shown in Fig. 1, the arc is thus struck and preferably kept submerged under a relatively deep layer of granular flux, which at the same time as the bead is formed will be at least in part rendered molten and provide a protective covering for the highly heated weld metal. In order to interrupt the operation it is merely necessary to break the arc by withdrawing the tool from the work-piece with a quick movement exceeding in speed the advancing movement of the wire. Or, by stopping the motor, the wire will automatically melt back to a point where the arc will no longer be sustained.

The simplicity of the foregoing operation will be obvious. At the same time the manipulation of the weld rod through the medium of the tubular flexible guide T and the terminal fitting thereon which takes the place of the unwieldly weld tool heretofore in use is equally simple and convenient. The operator merely has to take hold of such terminal fitting, or rather of the insulated coupling member 20 adjacent thereto, and move such fitting, with the end of the wire protruding therefrom, along the line to be welded.

As previously indicated, the modification illustrated in Fig. 7 relates to the terminal member which forms the welding tool, such terminal member being designed to deposit a layer of fluxing material along the line to be welded. To this end, in place of a terminal fitting comprising simply a tubular core 35 as illustrated in Fig. 6, such fitting comprises a core 45 of substantially the same construction and adapted to be connected in the same fashion to a male coupling member 20 of a flexible tube section; however, said core, instead of having a conical extension, carries a curved tube 46 which is fitted at its outer end with a conical extension 47. A separate section 48 of a flexible coil similar to coil 15 employed in the flexible guide sections T extends from member 45 to member 47 and provides the conduit through which the weld rod or wire W is guided to its point of emergence beyond said member 47.

Attached to said core member 45 is a light weight receptacle or hopper 49 of general conical form, the point of attachment being intermediate of the ends of said receptacle. At such point the curved wire guide member 46 enters the receptacle and thence extends downwardly so that the nozzle member 47 will be disposed centrally within the opening 50 at the lower end of the receptacle. A lid or cover 51 is desirably hingedly attached to the upper larger end of the receptacle and is provided with a snap catch 52 whereby such cover may be retained in closed position irrespective of the position of the receptacle.

In using such modified terminal member, assuming the same to be coupled to the end of a flexible tubular guide section T, the receptacle is filled with a powdered or granular fluxing material and when held in the position illustrated in Fig. 7 such material will be free to flow through opening 50 around nozzle member 47 and thus enable the operator to deposit a layer of such flux along the line to be welded simultaneously with the welding operation. When it is desired to interrupt the welding operation, the arc being broken in the manner above described, the receptacle, without requiring to be detached, may be simply inverted and rested on its larger end which is closed by cover 51. Then upon resuming operation the position of the receptacle with the terminal member to which it is attached is simply again reversed to that shown in Fig. 7.

The modified apparatus diagrammatically illustrated in Fig. 8 is identical with that shown in Fig. 1 in the matter of weld rod or wire feed mechanism except that such mechanism is designed to simultaneously feed a plurality (three as shown) of weld rods or wire to the work-piece W'. To the extent that the same parts are employed, such parts have been designated by the same reference numerals as in Fig. 1. However, instead of a single reel from which the weld rod or wire is drawn, a plurality of reels 1a, 1b and 1c are provided and a corresponding number of flexible tubular guides T. Another difference which, although optional, should be noted, is that the lead 9 which in the apparatus illustrated in Fig. 1 instead of being connected with the flexible tubular guide at its inner wire receiving end is connected with the outer or discharge ends of such plural tubular guides T by means of a clamp C. It will thus be seen that all of the weld rods or wires are connected in parallel in the welding circuit.

The operation of such modified apparatus will be substantially identical with that described in connection with the first form of apparatus illustrated in Fig. 1, the startling result being achieved that despite such connection in parallel of the weld rods or wires there is no preferential flow of current such as has always heretofore occurred with the result that the arc at the end of one or the other of the wires becomes almost immediately extinguished, but the ends of all the wires are maintained in arcing relation to the work-piece. By the same token, upon setting the apparatus in operation, arcs may be simultaneously struck between the ends of all the weld rods or wires and the work-piece. We have found that as many as five or six arcs may be thus established and maintained by using that number of weld rods or wires under conditions and in the manner hereinbefore described.

Where plural weld rods or wires are thus utilized, they may be moved along the work-piece so that the respective arcs struck therebetween and the latter will follow consecutively, as illustrated in Fig. 8, with the result that superimposed welds are formed, as illustrated in Fig. 10, such operation exemplifying the method described and claimed in U. S. Patent No. 2,320,824 to G. G. Landis and L. Keaver Stringham, dated June 1, 1943. On the other hand, movement of the weld rods along the work-piece may be in side-by-side relation and thus form three separate welds or beads in corresponding relation, as illustrated in Fig. 11. Ordinarily in using the apparatus to thus form welds or beads in side-by-side relation the latter will be laid down sufficiently closely so as to merge with each other, as illustrated in Fig. 12. This method of use will be particularly advantageous where it is desired to coat a workpiece of one metal with another metal or alloy of different composition, as in making various kinds of clad plates, i. e. plates of a base metal having one or both surfaces coated with a more durable or resistant metal or alloy.

As illustrated in Fig. 9, a flux feeding receptacle or hopper 49a, similar to that illustrated in Fig. 7, may be equally well attached to the terminals, modified in the same manner, through which such plural weld rods or wires are fed to the work. As further illustrated in Fig. 13, plural, e. g. two, weld rod or wire guides T may be equipped with separate flux receptacles or hoppers 49, exactly as illustrated in Fig. 7, and by adjustably mounting the latter on a suitable support S the respective wires W may be guided into the angles formed between a work-piece $W^2$ resting on a work-piece $W^3$ so as simultaneously to form two fillet welds between such work-pieces.

It will be understood that our improved arc welding apparatus in the several forms thus shown and described may or may not be used to carry on arc welding under a deep layer of flux. While such operation is indicated in Fig. 1, it will be observed that in Fig. 8, on the contrary, such deep flux layer has been omitted. In such case of course there will be no occasion to employ a flux hopper such as illustrated in Figs. 7, 9 and 13, but such flux as may be required may be applied in a thin layer along the line to be welded or may be carried by the weld wire itself. It should be noted that, owing to the reduced diameter of the latter, a coating of flux thereon of given thickness will provide a substantially greater amount of flux per unit of wire than where applied in a coating of the same thickness to a weld or rod of larger diameter.

Other modes of applying the principle of our invention may be employed instead of the one explained, change being made as regards the mechainsm herein disclosed, provided the means stated by any of the following claims or the equivalent of such stated means be employed.

We therefore particularly point out and distinctly claim as our invention:

1. In an arc welding system wherein a metallic electrode in the form of a wire is fed in the direction of its length continuously to the work and an arc welding current of high density is imposed on such electrode, the combination of unidirectional electrode feeding means, welding current leads adapted to be directly connected with such electrode and the work respectively, the connection of the lead for such electrode being located closely adjacent the arc end thereof, an electric motor for driving said electrode feeding means, said motor having its field connected with an independent, fixed source of voltage and its armature connected across said welding current leads, operation of said motor to feed such electrode being independent of any traversing movement of said electrode relatively to the work and the flow of welding current through said leads being solely controlled during welding operation by making and breaking contact between the arc-end of said electrode and the work, and a relay switch operable by the current in one of said leads adapted to make and break the supply of current to the armature of said motor.

2. In arc welding apparatus wherein a metallic electrode in the form of a plurality of independent wires is fed continuously to the work and an arc welding current of high density is imposed on such electrode, the combination of uni-directional electrode feeding means constructed and arranged to feed all said wires simultaneously at the same rate, welding current leads connected with such wires and the work, respectively, the connection of the leads for such wires being located closely adjacent the arc ends thereof, such ends being thus included in the welding circuit in parallel relation to each other and the flow of welding current therethrough being solely controlled during welding operation by making and breaking contact between such ends and the work, an electric motor for driving said feeding means, said motor having its field connected with an independent, fixed source of current and its armature connected across said welding current leads, and a relay switch operable by the current in one of said leads adapted to make and break the supply of current to the armature of said motor.

GEORGE G. LANDIS.
NORMAN J. HOENIE.

REFERENCES CITED

The following references are of record in the file of this patent:

UNITED STATES PATENTS

| Number | Name | Date |
|---|---|---|
| 1,241,574 | Sykes | Oct. 2, 1917 |
| 1,340,056 | Kenyon | May 11, 1920 |
| 1,374,404 | Soons et al. | Apr. 12, 1921 |
| 1,508,689 | Glasser | Sept. 16, 1924 |
| 1,827,245 | Lincoln et al. | Oct. 13, 1931 |
| 1,875,066 | MacFarland | Aug. 30, 1932 |
| 1,953,915 | Burgett | Apr. 3, 1934 |
| 2,211,424 | Holslag | Aug. 13, 1940 |
| 2,265,687 | Chapman | Dec. 9, 1941 |
| 2,286,028 | Tuttle | June 9, 1942 |
| 2,364,920 | Shaffer | Dec. 12, 1944 |
| 2,367,257 | Band | Jan. 16, 1945 |
| 2,393,662 | Skuhrovec | Jan. 29, 1946 |
| 2,402,937 | Stringham | June 25, 1946 |